: US 11,784,995 B1
(45) Date of Patent: Oct. 10, 2023

(54) DIGITAL IDENTITY SIGN-UP

(71) Applicant: Early Warning Services, LLC, Scottsdale, AZ (US)

(72) Inventors: Gregory Slowiak, Chicago, IL (US); Eric Woodward, San Francisco, CA (US); Philip Lam, San Francisco, CA (US); Jeff Shultz, Waco, TX (US)

(73) Assignee: Early Warning Services, LLC

( * ) Notice: Subject to any disclaimer, the term of this patent is extended or adjusted under 35 U.S.C. 154(b) by 0 days.

(21) Appl. No.: 16/908,443

(22) Filed: Jun. 22, 2020

Related U.S. Application Data

(60) Provisional application No. 62/864,891, filed on Jun. 21, 2019, provisional application No. 62/864,900, (Continued)

(51) Int. Cl.
*G06F 7/04* (2006.01)
*H04L 9/40* (2022.01)
*H04W 12/06* (2021.01)

(52) U.S. Cl.
CPC ...... *H04L 63/0815* (2013.01); *H04L 63/0807* (2013.01); *H04L 63/0823* (2013.01); *H04W 12/06* (2013.01)

(58) Field of Classification Search
CPC ...... G06F 21/12; G06F 21/31; G06F 21/6245; G06F 21/6272; H04L 9/08; H04L 63/045;
(Continued)

(56) References Cited

U.S. PATENT DOCUMENTS 10,069,811 B2 9/2018 Curtis et al.
10,237,259 B2 3/2019 Ronda et al.
(Continued)

FOREIGN PATENT DOCUMENTS

CA 3074350 A1 9/2020

OTHER PUBLICATIONS

Vassilev et al, Personal Brokerage of Web Service, Oct. 1, 2007, IEEE, pp. 24-31. (Year: 2007).*
(Continued)

*Primary Examiner* — Philip J Chea
*Assistant Examiner* — Jenise E Jackson
(74) *Attorney, Agent, or Firm* — KILPATRICK TOWNSEND & STOCKTON LLP

(57) ABSTRACT

Disclosed herein is an identity network that can provide a universal, digital identity for users that can be used to authenticate the user by an identity provider for relying parties to utilize for confirming the identity of the user during sign-up. The identity network receives a request from a relying party that includes deep linking to an identity provider selected by the user. The request specifies the user and any other information about the user the relying party is requesting. A service of the identity network launches the application for the identity provider on the user's device and the user logs into the identity provider's application, which provides the user authentication/validation and information about the user to the identity network. The identity network can then provide the information to the relying party, which the relying party can rely on for creating an account with the relying party for the user.

20 Claims, 6 Drawing Sheets

Related U.S. Application Data filed on Jun. 21, 2019, provisional application No. 62/864,906, filed on Jun. 21, 2019, provisional application No. 62/864,911, filed on Jun. 21, 2019, provisional application No. 62/864,889, filed on Jun. 21, 2019.

(58) Field of Classification Search
CPC ............. H04L 63/0815; H04L 63/0807; H04L 63/0823
See application file for complete search history.

(56) References Cited

U.S. PATENT DOCUMENTS

| | | |
|---|---|---|
| 10,853,791 B1 | 12/2020 | Ellis et al. |
| 11,157,954 B1 | 10/2021 | Belanger et al. |
| 2006/0129816 A1* | 6/2006 | Hinton ................ H04L 63/0815 713/169 |
| 2009/0133107 A1* | 5/2009 | Thoursie ................ H04L 63/10 726/6 |
| 2010/0145861 A1* | 6/2010 | Law ..................... G06Q 20/326 705/76 |
| 2010/0154046 A1 | 6/2010 | Liu et al. |
| 2013/0036456 A1* | 2/2013 | Boysen ................ H04L 9/3215 726/4 |
| 2013/0086657 A1* | 4/2013 | Srinivasan ........... H04L 9/3234 726/6 |
| 2014/0173754 A1 | 6/2014 | Barbir |
| 2014/0359741 A1* | 12/2014 | Kistner ................ H04L 67/146 726/7 |
| 2015/0332029 A1* | 11/2015 | Coxe ..................... G06Q 20/00 726/9 |
| 2017/0186084 A1 | 6/2017 | Koch |
| 2018/0145979 A1* | 5/2018 | Lu ........................ H04L 67/306 |
| 2018/0152440 A1 | 5/2018 | Hande et al. |
| 2018/0181745 A1* | 6/2018 | Chen .................... G06Q 50/265 |
| 2018/0219846 A1* | 8/2018 | Poschel ............. H04L 63/0807 |
| 2018/0267847 A1* | 9/2018 | Smith ................. G06Q 20/322 |
| 2019/0261169 A1* | 8/2019 | Kamal ................. H04W 12/37 |
| 2020/0213297 A1 | 7/2020 | Suraparaju |
| 2020/0366671 A1 | 11/2020 | Larson et al. |
| 2021/0014218 A1* | 1/2021 | Kurylko ................. H04L 9/085 |
| 2021/0320799 A1 | 10/2021 | Bankston |
| 2021/0326426 A1 | 10/2021 | Bouse |

OTHER PUBLICATIONS

Goswami et al, A Replay Attack Resilient System for PKI Based Authentication in Challenge-Response Mode for Online Application, Dec. 21, 2014, IEEE, pp. 144-148. (Year: 2014).*

U.S. Appl. No. 16/908,435 received a Non-Final Office Action, dated Nov. 2, 2021, 14 pages.

U.S. Appl. No. 16/908,460 received a Notice of Allowance, dated Jan. 12, 2022, 10 pages.

U.S. Appl. No. 16/908,435 received a Notice of Allowance, dated Mar. 17, 2022, all pages.

* cited by examiner

DIGITAL IDENTITY SIGN-UP

RELATED APPLICATIONS

This application claims the benefit of and priority to, pursuant to 35 USC § 119, U.S. Provisional Application No. 62/864,891, filed Jun. 21, 2019, entitled "DIGITAL IDENTITY," U.S. Provisional Application No. 62/864,900, filed Jun. 21, 2019, entitled "DIGITAL IDENTITY SIGN-UP," U.S. Provisional Application No. 62/864,906, entitled "DIGITAL IDENTITY SIGN-IN," U.S. Provisional Application No. 62/864,911, entitled "DIGITAL IDENTITY STEP-UP," and U.S. Provisional Application No. 62/864,889, entitled "DIGITAL IDENTITY LOCK," each of which is assigned to the assignee hereof, and each of which are incorporated herein in their entirety by reference for all purposes.

U.S. Patent Application Ser. No. 16/908,435, filed concurrently herewith, entitled "DIGITAL IDENTITY," U.S. Patent Application Ser. No. 16/908,453, filed concurrently herewith, entitled "DIGITAL IDENTITY SIGN-IN," U.S. Patent Application Ser. No. 16/908,456, filed concurrently herewith, entitled "DIGITAL IDENTITY STEP-UP," and U.S. Patent Application Ser. No. 16/908,460, filed concurrently herewith, entitled "DIGITAL IDENTITY LOCK," are each incorporated by reference in their entirety for all purposes.

BACKGROUND

Most companies have an online presence today and each has information about each of its users and customers. However, authentication of a user is largely handled piecemeal by each company with little verification of the user by a trusted source. The current way that users are onboarded and authenticated lacks security, consistency, and ease of use for both the companies and the users. Additionally, current methods to perform identity verification online have considerable drawbacks in coverage, validity, and usability

SUMMARY

Figure 1:
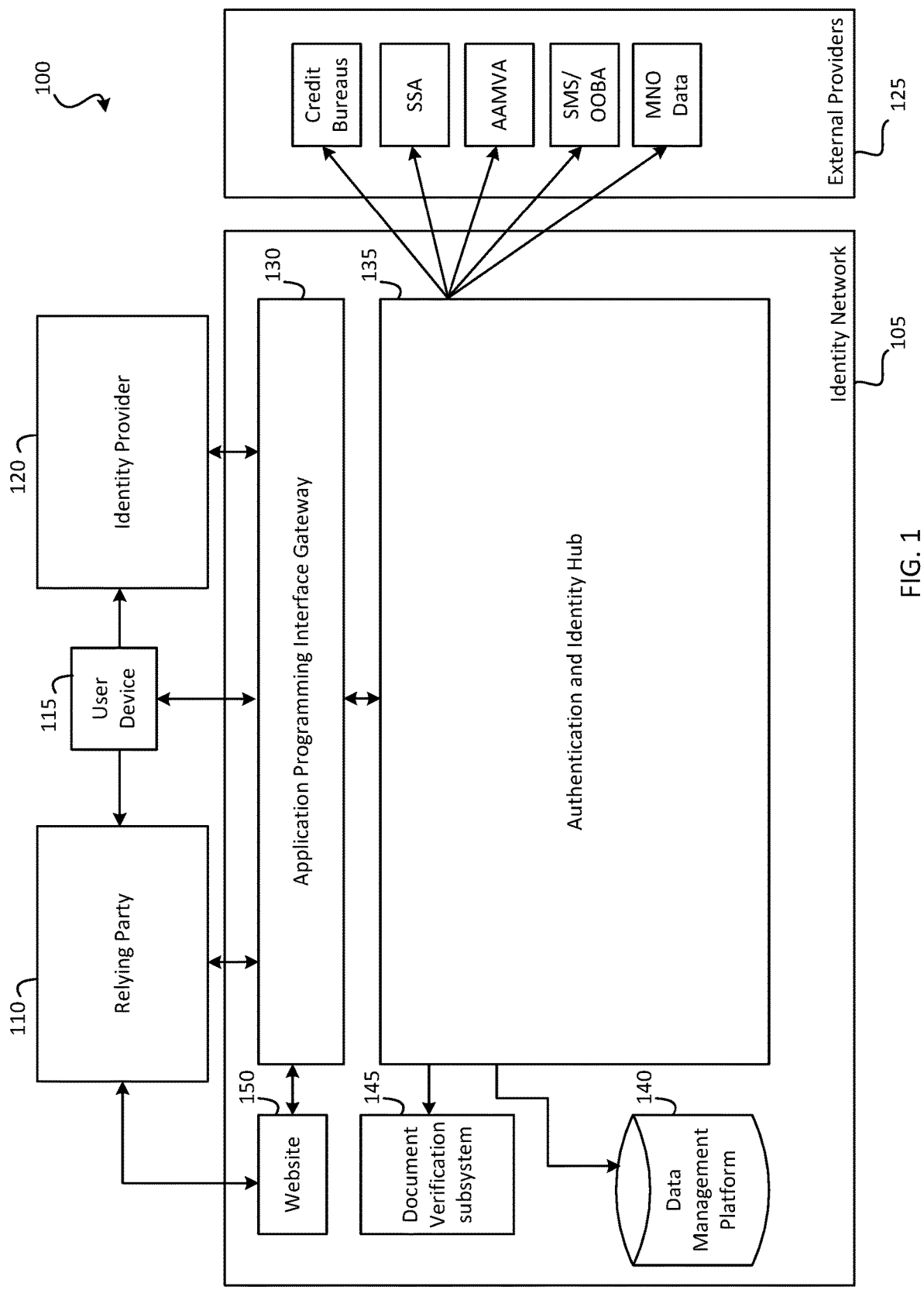
FIG. 1 illustrates an example system for providing an authenticated, universal digital identity for a user, according to an embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for using an authenticated digital identity in account creation with an identity network. The identity network may receive a sign-up request for a user from a relying party, where the sign-up request includes requested information. In response to receiving the sign-up request, the identity network provides a session identifier for the sign-up request to the relying party. The identity network provides, within a relying party mobile application using an identity network software development kit, a list of identity providers from which the user may select an identity provider. In response to receiving a selection of a first identity provider from the list of identity providers, the identity network may launch, using the identity network software development kit, a first identity provider mobile application, where launching the first identity provider mobile application includes providing the session identifier to the first identity provider mobile application. The identity network may receive a validation of authentication of the user from the first identity provider mobile application. In response to receiving the validation, the identity network may request the requested information from the first identity provider, where the session identifier is provided with the request for the requested information. The identity network may receive at least a portion of the requested information and the session identifier from the first identity provider. The identity network may encrypt the requested information with a cryptographic key and transmit the encrypted information and the session identifier to the relying party. Other embodiments of this aspect include corresponding computer systems, apparatus, and computer programs recorded on one or more computer storage devices, each configured to perform the actions of the methods.

Implementations may include one or more of the following features. Optionally, the identity network may receive a detail request for the sign-up request from the first identity provider mobile application, where the detail request includes the session identifier. In response to receiving the detail request, the identity network may provide at least a portion of the sign-up request to the first identity provider mobile application. The identity network may request, via the first identity provider mobile application using a second software development kit, consent from the user to provide the requested information included in the sign-up request. Optionally, the identity network may validate the user. The identity network may transmit the validation with the encrypted information and the session identifier to the relying party. Validating the user may include calculating a confidence score of the user. Optionally, the identity network may obtain other information regarding the user from a third party. Optionally, the confidence score of the user may be calculated based at least in part on the other information. Optionally, the identity network may transmit the confidence score with the encrypted information and the session identifier to the relying party. Optionally, the identity network may transmit the other information with the encrypted information and the session identifier to the relying party. Optionally, the identity network may transmit the cryptographic key and the session identifier to the relying party. Implementations of the described techniques may include hardware, a method or process, or computer software on a computer-accessible medium.

DETAILED DESCRIPTION

The explosion of online user activity and data over the past decades have resulted in a disparate system in which most online companies have developed their own systems for users to sign-up, sign in, and utilize their services. Authentication of users is often difficult to ensure that online identity theft and other sinister activities are avoided. Further, the process for creation of new accounts and tracking of countless passwords for users is tedious.

To solve the problem of invalid authentication and password security for users, described herein is a system for an authenticated, universal digital identity that a user may use to create new accounts with relying parties of the system. The identity network that allows a user to sign up with a relying party using authentication from an identity provider solves the technical problem faced by many online companies that a user may provide information to create an account, and the company has no way to verify or authenticate the new user. Companies cannot be sure that existing users are verified other than through their own password systems, which suffer from password theft issues and invalid initial sign up. Accordingly, the technical solution described herein provides a consistent and technical way for the company to authenticate the user using a universal online digital identity.

Users often have a trusted relationship with their banks, and banks are regulated so certain precautions are taken by banks to ensure the user is a legitimate and authenticated user. Banks and other providers that have regulated processes for identifying users may be used to authenticate users with a digital identity authentication and provide information on the users for relying companies by becoming an identity provider in the disclosed identity network. Relying companies, such as insurance companies, retailers, and so forth can enroll with the identity network to gain the benefit of the identity provider authenticating the digital identity of users and customers and providing verified information upon account sign-up for a new customer. The identity network can broker authentication and information exchange using cryptographic technology and other verifiable methods between the relying party and the identity provider. Additional technological value can be provided by the identity network which can oversee and identify suspicious activity overall for a device or user, obtain information from various third parties for the relying party to further validate the user, and so forth.

FIG. 1 illustrates an example digital identity system 100 for authenticated, universal digital identities for users. System 100 includes an identity network 105, relying party 110, user device 115, identity provider 120, and external providers 125. Components or functionality described may be combined into fewer components or expanded into more components without departing from the scope of the invention.

Identity network 105 may include a network of one or more computers, such as computing device 600. The identity network 105 may include application programming interface gateway 130, authentication and identity hub 135, data management platform 140, document verification subsystem 145, and website 150. Identity network 105 may include other components or functionality than discussed or functionality may be combined into fewer or more components without departing from the scope of the invention. Identity network 105 provides the functionality to broker authentication and information exchange between the relying party 110 and the identity provider 120 as discussed in more detail herein.

Application programming interface gateway 130 provides a gateway for the relying party 110, user device 115, identity provider 120, and the website 150 to interact with the authentication and identity hub 135. The authentication and identity hub 135 interfaces between various components and collects information needed for identity assertions. For example, authentication and identity hub 135 may collect information from external providers 125 including, for example, credit bureaus, the social security administration, the American association of motor vehicle administrators, and other external providers that utilize out-of-band authentication (e.g., secure message service out-of-band authentication), and/or mobile network operator data. Various data from external providers may be used depending on the request from the relying party 110, which will be described in greater detail with respect to FIG. 2.

Authentication and identity hub 135 also interfaces with the document verification subsystem 145 for verifying documents. The document verification subsystem 145 may be a third party subsystem or may interface with a third party subsystem in some embodiments. The authentication and identity hub 135 may interface with the document verification subsystem 145 using an application programming interface. The document verification subsystem enables the identity network 105 to request a standard identity document from an end user on user device 115. The standard identity document may be, for example, a driver license, state-issued identification, or country-issued passport. The document verification subsystem 145 can validate the document presented by the user is a legitimate document, that the identity attributes match those of the identity provider 120 for the given user, and that the document photo matches the end user holding the document. The document verification subsystem 145 can also verify data submitted by an end user against data found on authoritative documents such as a state issued driver license or a United States Passport, for example. In some embodiments, when a user submits data or information using user device 115, the authentication and identity hub 135 may provide the data to the document verification subsystem 145 in conjunction with information from an external provider 125. The document verification subsystem 145 can extract information from the documents provided from the external providers 125 and compare it to the data the user provided. For example, the user may provide a driver license number, and the document verification subsystem 145 may extract the user's driver license number from the user's driver license obtained from an external provider 125 (e.g., the state department of motor vehicles) and compare the two values to ensure the user entered data is accurate.

Authentication and identity hub 135 also interfaces with data management platform 140. Data management platform 140 can provide, for example, identity reputation scores and/or device reputation information. For example, the identity network 105 may identify based on a common device id (described in more detail with respect to FIG. 4) activity of a device at one or more identity providers 120 and/or one or more relying parties 110. This activity can be modelled and compared to models that may indicate whether the activity the device is engaging in is suspicious. If suspicious activity is detected, new requests may be flagged for the relying party 110 requesting the information or authentication. Similar to device reputation, identity reputation models capture network behavior of a given user to determine inconsistencies that correlate to potential fraud. The identity reputation and/or the device reputation information may be used to generate an identity confidence score used to help a relying party determine if the confidence is sufficient to proceed with the relying party use of the digital identity or if the relying party may instead, for example, require additional authentication information from the user. The authentication and identity hub 135 can interface with the data management platform 140 using an application programming interface.

Website 150 may be an internet interface provided by identity network 105 that a relying party 110 may redirect the end user, for example, to select their identity provider 120 when a request is initiated. Website 150 may redirect the user to their identity provider 120 website or mobile application via a matrix barcode (e.g., a QR code), a deep link, a website link, or via a short message service (SMS) or mobile push notification. In some embodiments, the relying party 110 may include a software development kit from the identity network 105 that is used to redirect the user to the website 150 to select the user's identity provider 120 when a request is initiated.

Authentication and identity hub 135 may communicate digital identity data that is obtained from the identity provider 120 to the relying party 110 when the identity network 105 fulfills an identity assertion. An identity assertion may be an authentication request in which the relying party 110 requests that the identity provider 120 validate or authenticate the digital identity of the user. The authentication request is sent to the identity network 105 from the relying party 110 and forwarded to the identity provider 120 by the identity network 105.

Data management platform 140 is used to provide ledger functionality (e.g., distributed or non-distributed ledger or hyper ledger functionality) to identity network 105. The ledger may store a registered identifier for each user registered to a particular identity provider 120. It may also be used to create a record of instance of the sharing of identity attributes from identity provider 120 to a relying party 110 on behalf of an end user. Each request and response for authentication and digital identity data may be passed through the authentication and identity hub 135 to store every transaction in the ledger.

Digital identity data may be provided from the identity provider 120 to the authentication and identity hub 135. The hub may provide the digital identity information to the relying party 110.

Relying party 110 may be any company that would like to be able to authenticate the digital identity of a user. Examples of relying parties 110 include insurance companies, retailers, travel companies (e.g., airlines, hotels, cruise lines), and the like. While only a single relying party 110 is depicted in FIG. 1 for the sake of simplicity of explanation, any number of relying parties 110 may be included in system 100.

Figure 6:
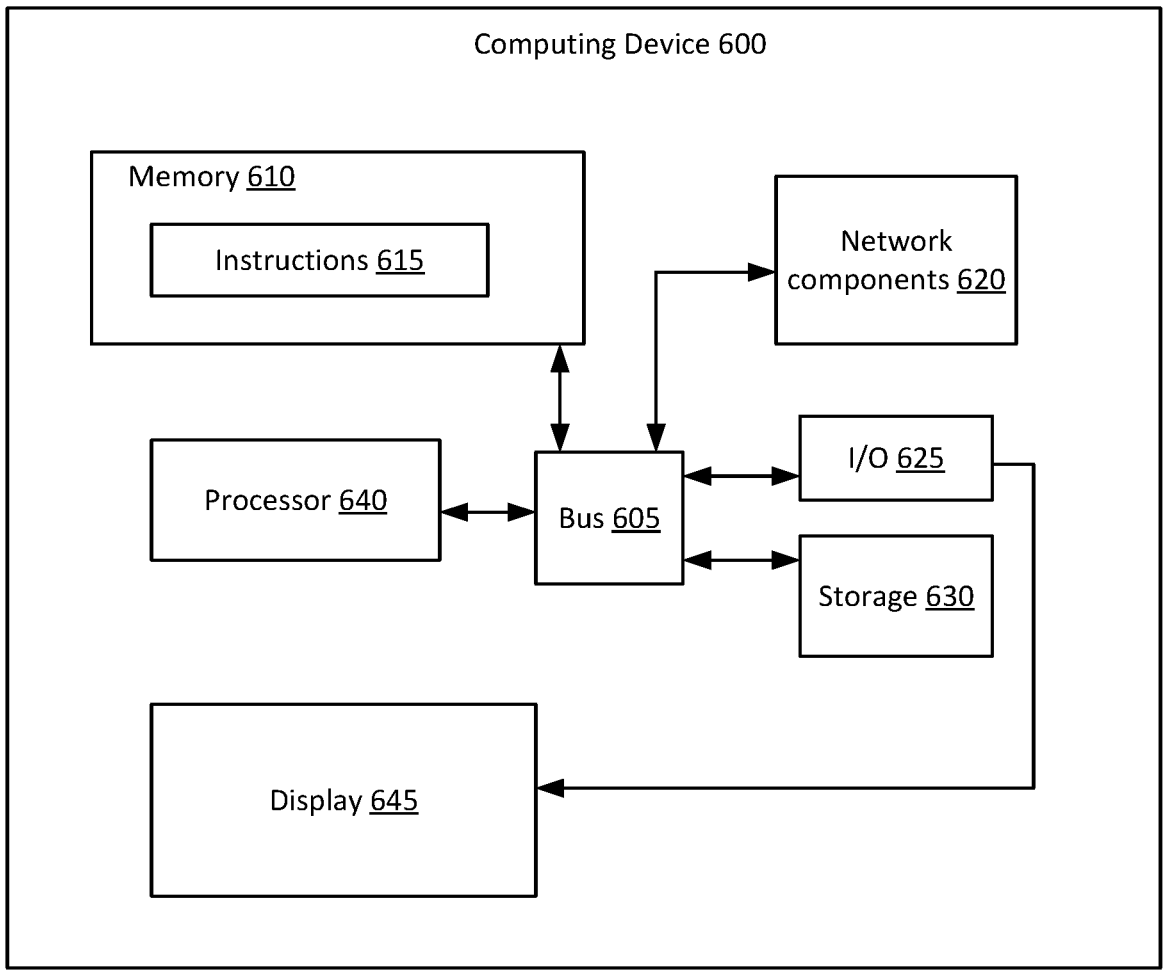
FIG. 6 illustrates an example computer system.

User device 115 may be any suitable computing device, such as computing device 600, as depicted and described with respect to FIG. 6, of a user. For example, user device 115 may be a laptop, smartphone, desktop computer, tablet, smartwatch, and the like. While only a single user device 115 is depicted in FIG. 1 for the sake of simplicity of explanation, any number of user devices 115 may be included in system 100.

Identity provider 120 may be any suitable company that can authenticate a user having user device 115 for relying party 110. Identity provider 120 may include, for example, financial institutions. Identity provider 120 may have detailed information and have verified the identity of the user of user device 115 because, for example, financial institutions are regulated by the government with respect to identifying customers with specificity. While only a single identity provider 120 is depicted in FIG. 1 for the sake of simplicity of explanation, any number of identity providers 120 may be included in system 100.

In use, a user may access a relying party 110 website using the user device 115. For example, the user may wish to initiate a new relationship with the relying party 110 to, for example, become a customer of the relying party 110. The relying party 110 may request digital identity authentication and information for the user of user device 115 from the identity network 105 via website 150. In some embodiments, user device 115 may access a mobile application of relying party 110. The mobile application may access website 150 with an identity assertion. The identity assertion may be a request to authenticate the digital identity of the user and, in some cases, request additional information about the user. In response, the website 150 may provide a list of identity providers 120 for the user to select for authenticating the user's digital identity. The list may include many identity providers 120, and the user should select an identity provider with which the user has a relationship. For example, if the user is a customer of BankA, and BankA is an identity provider in the list, the user may select BankA as the identity provider for authenticating that user's digital identity. If the user has a relationship with multiple identity providers 120, the user may select any one of the identity providers 120 with which the user has a relationship. Once the user selects an identity provider 120, the application programming interface gateway 130 may receive the identity assertion including requested data about the user and the selected identity provider 120 and provide the entire request to the authentication and identity hub 135. The authentication and identity hub 135 may then provide the identity assertion to the identity provider 120. The identity provider 120 can authenticate the digital identity of the user and provide the requested information via the application programming interface gateway 130 to the authentication and identity hub 135. The authentication and identity hub 135 may obtain other information requested by the relying party 110 but not included from the identity provider 120. The authentication and identity hub 135 may request and obtain the information from the external providers 125, for example. Once the information is complete, the authentication and identity hub 135 may provide the information and acknowledgement of the authentication of the user's digital identity to the relying party 110. If the identity provider 120 cannot authenticate the digital identity of the user, the identity provider 120 can provide such failed authentication notice to the authentication and identity hub 135, and the authentication and identity hub 135 can inform the relying party 110 of the failed authentication.

Figure 2:
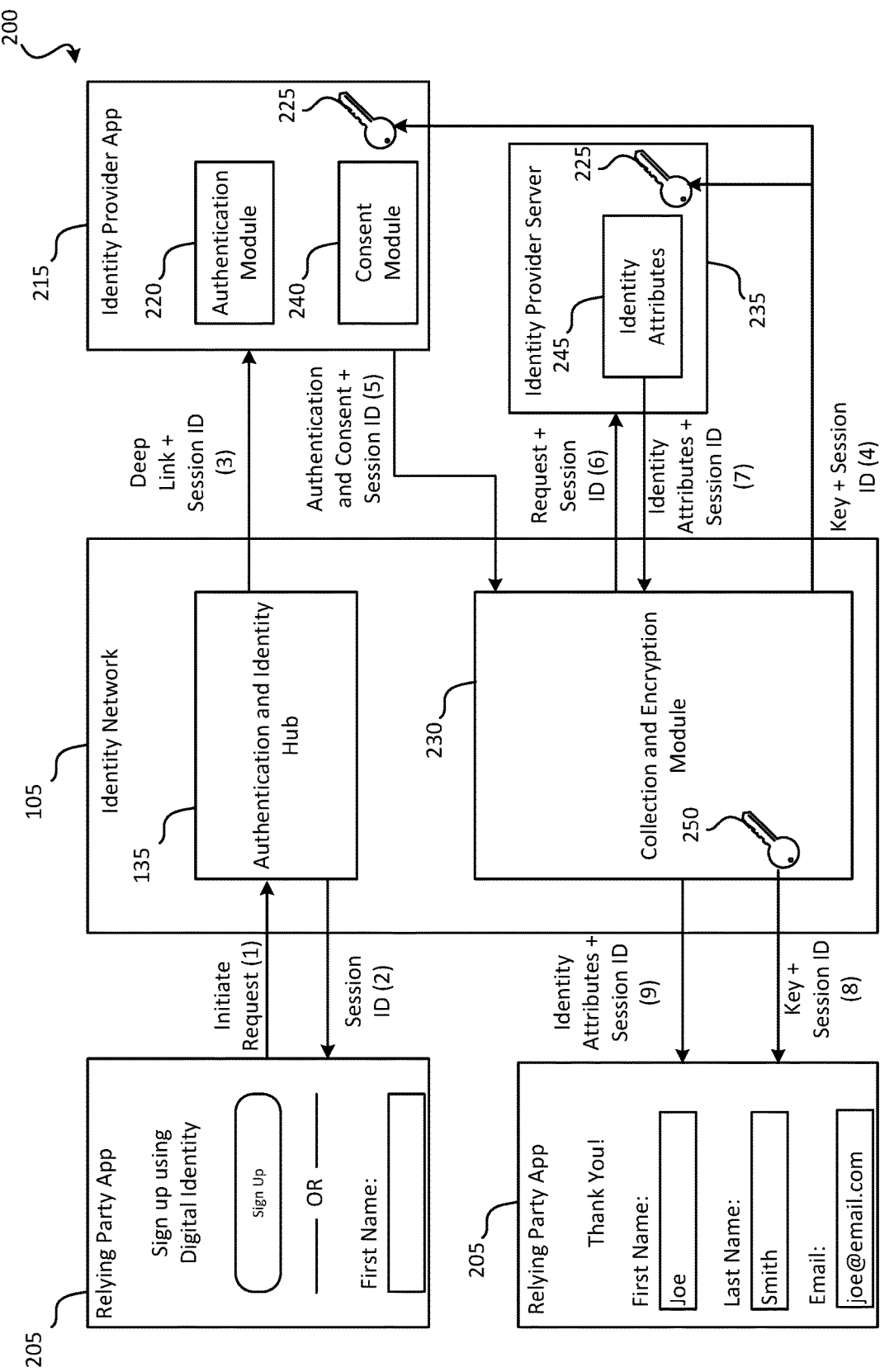
FIG. 2 illustrates an example data information flow using an authenticated, universal digital identity for a user, according to an embodiment.

FIG. 2 illustrates an example data flow 200 of data through an authenticated, universal digital identity system. The data flow 200 includes the relying party application 205, the identity network 105, the identity provider application 215, and the identity provider server 235. The identity provider application 215 and the identity provider server 235 collectively are included in the identity provider 120 as described with respect to FIG. 1. Starting with the relying party application 205, the user may decide to sign-up for access to the relying party using the user's universal digital identity. The request (Initiate Request (1)) is initiated to the authentication and identity hub 135 of the identity network 105. In some embodiments, the identity network 105 may provide a list of identity providers for the user to select from. Once the identity provider is selected, the authentication and identity hub 135 identifies a token associated with the user for the selected identity provider. In some embodiments, the authentication and identity hub 135 may use a user provided token to look up the associated identity provider. For example, when the user signs up and requests an identity provider 120 to authenticate the user, a token may be received and saved in the authentication and identity hub 135 for the user/identity provider relationship so that upon later requests to authenticate, the token can be identified in the authentication and identity hub 135 and the same identity provider used. In some embodiments, the token is provided by the user with the selection of the identity provider, in some embodiments, the identity provider may provide the token upon first request by the identity network 105 to authenticate the user with the identity provider, or in some embodiments, the identity network may generate a token for storing the user/identity provider relationship. The identity network 105 generates a session ID and provides it to the relying party application 205 (Session ID (2)). Deep linking is used on the user's device to launch the identity provider application 215 (Deep Link+Session ID (3)). The deep link includes the session ID generated by the identity network 105, and that session ID is used throughout the process to track the activity associated with the initial request from the relying party application 205 for the specific user. The identity network 105 and the identity provider 120 (identity provider application 215 and identity provider server 235) may share a cryptographic key 225. In some embodiments, this key is known and used between the identity provider 120 and the identity network 105. In some embodiments, a cryptographic key is generated for each session. In such embodiments, the collection and encryption module 230 generates the cryptographic key 225 and provides it with the session ID to the identity provider server 235 and the identity provider application 215 (Key +Session ID (4)). In the identity provider application 215, the user logs into their account and is subsequently authenticated with authentication module 220. The identity provider application 215 may provide the consent information to the user via a user interface providing the user with the information the identity network 105 and identity provider 120 intend to provide to the relying party 110 using the consent module 240. The user may provide consent or decline consent. If consent is declined, the process flow halts and nothing further happens, or perhaps a failure message is sent to the relying party application 205 to notify it that the identity provider 120 will not be validating/authenticating the digital identity of the user. When the user provides consent, the identity provider application 215 may, in some embodiments, encrypt the consent and indication of authentication with cryptographic key 225. The authentication and consent (either encrypted or unencrypted) with the session ID are provided to the collection and encryption module 230 (Authentication and Consent+Session ID (5)).

The collection and encryption module 230, upon receiving the authentication and consent, sends a request including the session ID to the identity provider server 235 to obtain the identity attributes 245 of the user (Request+Session ID (6)). The identity attributes 245 include the information about the user that may have been requested by the relying party application 205 in the initial request. The Request+ Session ID (6), which may also include a device identifier of the user's device, is transmitted through the identity network 105 to the identity provider server 235. The user's device identifier may be used to observe suspicious activity for that device throughout the identity network as described in more detail with respect to FIG. 4.

The identity provider server 235 provides the identity attributes 245 to the collection and encryption module 230 of the identity network 105 (Identity Attributes+Session ID (7)). In some embodiments, the identity provider server encrypts the identity attributes 245 with cryptographic key 225. In some embodiments, cryptographic key 225 may be a different cryptographic key than that shared with identity provider application 215. Collection and encryption module 230 may be a submodule of authentication and identity hub 135 as described with respect to FIG. 1. Upon receipt, the collection and encryption module 230 may decrypt the identity attributes 245 and determine whether the requested information from the initial request of the relying party application 205 is all included. When there is missing information, the collection and encryption module may attempt to obtain any missing requested information from third parties. For example, the collection and encryption module 230 may attempt to obtain insurance information from an insurance company, driver information from a department of motor vehicle, or the like.

The collection and encryption module 230 may encrypt the identity attributes 245 and any other information obtained from third parties along with the confirmation of validation of authentication with an encryption key 250. The collection and encryption module 230 may transmit the encryption key 250 with the session ID to the relying party application 205 (Key+Session ID (8)) so that the relying party has the key for decrypting the information. While a specific cryptographic key is described, other forms of cryptography and transmission of the cryptographic keys may be used without departing from the scope of the invention including symmetric cryptography, asymmetric cryptography, or any other suitable cryptography that maintains the security of the user's information between the parties.

The collection and encryption module 230 may, upon receiving the user information and authentication and consent, and completing the encryption of the information with key 250, provides the encrypted identity attributes 245 and all additional information including the validation of authentication to the relying party application 205 (Identity Attributes+Session ID (9)). The relying party application 205 can use the encryption key 250 to decrypt the identity attributes 245 and other information and populate the user's information into the relying party application 205 form.

As an example of the third party information that may be obtained, in some embodiments, the user has requested to use a digital identity authentication to apply for a new account with a relying party such as an insurance company. The insurance company may initially request authentication of the user and provision of the user's first and last name, residential address, email address, telephone number, and credit score. The identity provider may be, for example, the user's primary bank that holds the user's checking and savings account. The identity attributes 245 may then include the user's first and last name, residential address, email address, telephone number, and credit score. In some embodiments, the user's credit score, for example, may not come from the identity provider but instead an external provider, such as a credit bureau. In such embodiments, collection and encryption module 230 may collect the credit score from the credit bureau and add the credit score to the other identity attribute 245. Once received at the relying party application 205, the identity attributes 245 may be filled into the relying party application form, as shown in part in FIG. 2.

Figure 3:
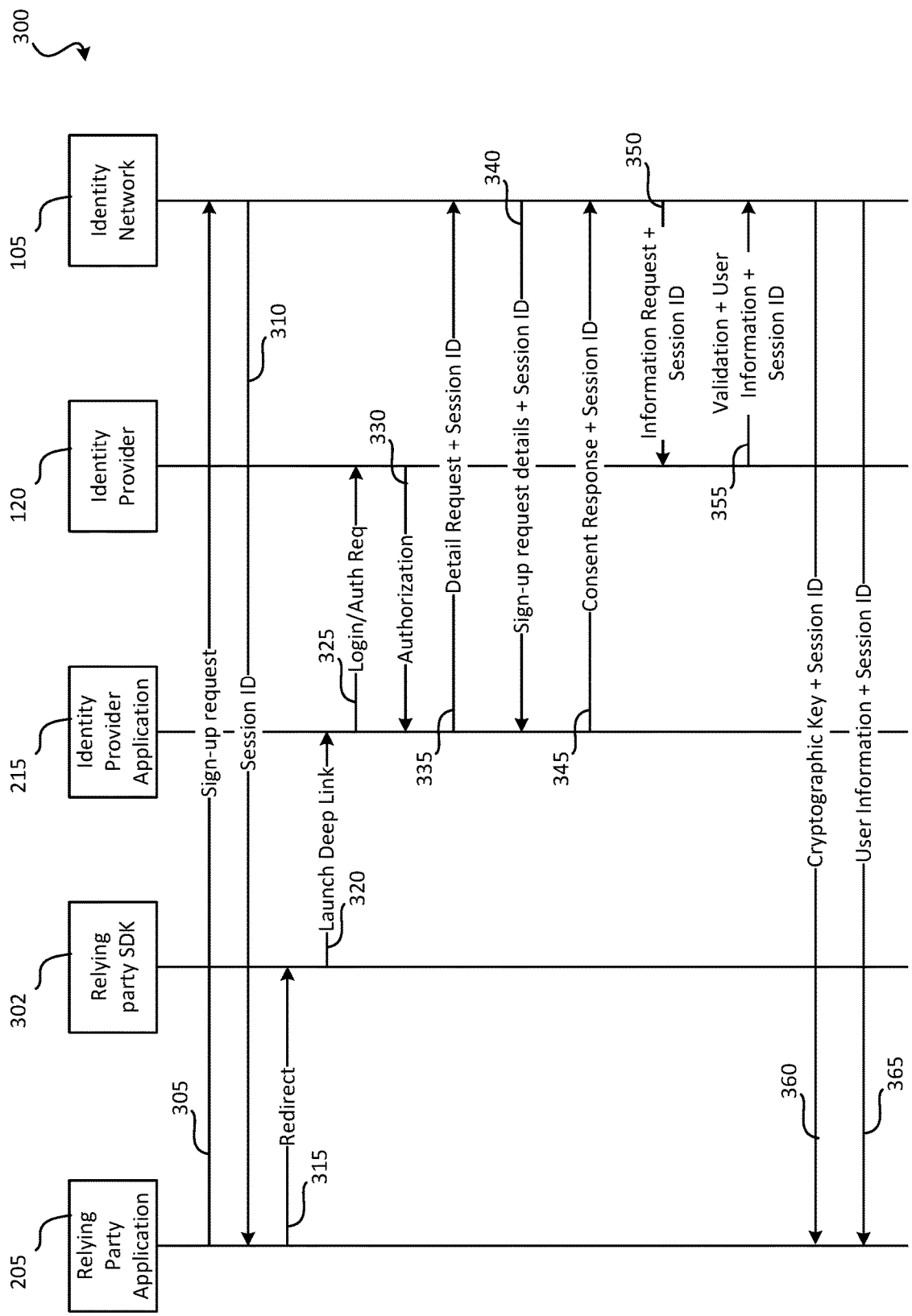
FIG. 3 illustrates an example swim diagram for a sign-up flow according to an embodiment.

FIG. 3 illustrates an example swim diagram 300 showing messaging and activities between components in the system 100 for a new user sign-up with a relying party 110. The swim diagram 300 includes communication and activities conducted by relying party 110, relying party application 205, identity provider application 215, identity provider 120, and identity network 105. Relying party application 205 may be the relying party's web or mobile application on the user's device. Relying party software development kit (SDK) 302 may be the software development kit components built into the relying party application. Identity provider application 215 may be the identity provider's web or mobile application on the user's device. Activities performed by identity provider 120 may be performed by a server or computer system such as computing device 600. Identity network 105 activities may also be performed by a server or computer system such as computing device 600.

The activity may truly begin when a user attempts to create an account with the relying party 110 by accessing the relying party application 205 on the user's device. A screen such as that shown in FIG. 2 may provide a sign-up button for the user to click. Upon clicking the button, the relying party application 205 may send a sign-up request to the identity network 105 as shown by arrow 305. The identity network may generate a session identifier (Session ID) for the sign-up request and transmit the session identifier to the relying party 110 as shown by arrow 310.

Upon receiving the session ID, the relying party application may redirect control of the application to the relying party SDK 302, providing the session ID to the SDK. The relying party SDK may provide a list of the available identity providers to the user via the user interface on the user's device. The user can select an identity provider with which the user has a relationship. For example, if Bank A is the bank with which the user has a checking account, the user may select Bank A from the list of available identity providers (that is an option if Bank A is an identity provider enrolled with the identity network 105). Each identity provider will have a deep link (for mobile applications) and/or a web link (for redirecting in a web application). When the user selects the identity provider 120, the relying party SDK 302 launches the identity provider application 215 using the deep link as shown by arrow 320.

The user will log into the identity provider application 215 as the user normally would when the application 215 launches, so the login information and authorization request is sent to the identity provider 120 as shown by arrow 325. If the login information is correct, the authorization is returned by identity provider 120 as shown by arrow 330.

The identity provider application 215 also includes an identity provider SDK which handles the request. First, the SDK requests the details of the sign-up request from the identity network 105 and includes the session ID with the request as shown by arrow 335. The identity network 105, upon receiving the detail request and session ID returns the sign-up request details and session ID to the identity provider application 215 as shown by arrow 340. The sign-up request details may include the sign-up request or some portion of it. As part of the sign-up request, the relying party application 205 requested user information. The details of the user information the relying party application 205 requested are returned at arrow 340.

Upon receiving the details of the sign-up request including what user information the relying party application 205 requested, the identity network SDK via the identity provider application 215 requests consent of the user to provide the user details to the relying party 110. The consent request may be a textual message that includes the details of the request or, in some embodiments, simply requests permission to provide user details to the relying party 110. If the user grants consent, the consent and session ID are sent to the identity network 105 as shown by arrow 345. The consent response may be provided to the identity network 105 even if the user declined to provide consent, at which time the identity network 105 may cancel the sign-up request.

Once the identity network 105 receives the consent and session ID, the identity network 105 transmits the information request and session ID to the identity provider 120 as shown by arrow 350. The information request includes requesting from the identity provider 120 the user information the relying party application 205 requested in the sign-up request. The identity provider 120 sends the user information that it maintains and the session ID back to the identity network 105 as shown by arrow 355.

Figure 4:
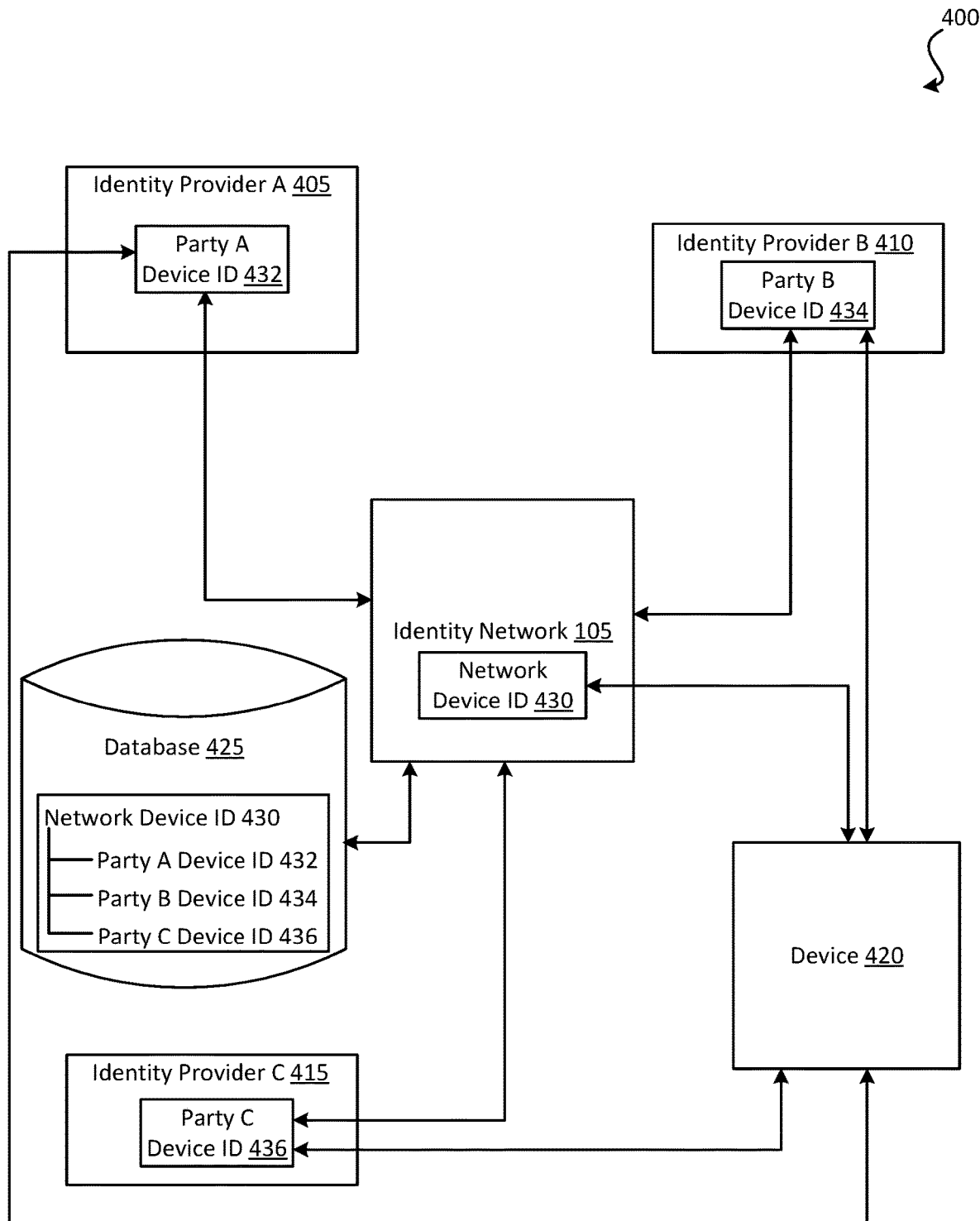
FIG. 4 illustrates an example common identifier data flow for identifying suspicious activity of a digital identity, according to an embodiment.

Once the identity network 105 receives the requested user information from the identity provider 120, the information may be encrypted using a known encryption key between the identity provider 120 and the identity network 105. The identity network may decrypt the information and validation confirmation. Identity network 105 may determine that, in some cases, there may be some requested user information that was requested by the relying party that the identity provider 120 did not have or provide. For example, the relying party 110 may be an insurance company and the user is requesting automobile insurance from the insurance company. The user information request may include, in that example, a copy of the user's driving record. The identity provider 120 may be the user's bank, but the user's bank may not have a copy of the user's driving record. In that case, the identity network may request the user's driving record from an external provider such as, for example, the department of motor vehicles for the state in which the user lives. In this way, the identity network 105 may obtain, using external sources beyond the identity provider 120, all of the user information the relying party 110 requested. For example the identity network may request user information from external providers that are not the relying party or the identity provider, receive the requested user information, and provide the received user information to the relying party or identity provider. In addition, the identity network 105 may provide confidence values for the user based on previous activities of the user with other enrollees of the identity network 105 including other relying parties 110 and other identity providers 120. Other validation of the user based on the user's device can also be provided. FIG. 4 discusses the device identifier associated with the user's device which allows the identity network 105 to track activities of the user's device and provide confidence information as well as flag suspicious activities.

Once the identity network 105 has all the information requested by the relying party application 205 in the sign-up request, the identity network 105 encrypts all of the information using a cryptographic key. All of the information may include the validation of authentication from the identity provider 120, the user information collected from third parties and the identity provider 120, confidence values that were calculated, and any other information that the identity network 105 is providing to the relying party application 205. The identity network 105 then provides the cryptographic key with the session ID to the relying party application 205 as shown by arrow 360. Separately, the identity network 105 provides the encrypted information and the session ID as shown by arrow 365. The relying party application 205, having the cryptographic key and the encrypted user's information and the associated session ID can decrypt the user's information with the cryptographic key and use the information to, for example, fill in the application form for the user as shown in FIG. 2.

FIG. 4 illustrates a system 400 showing common device identifiers for a device 420, which can be used by the identity network 105 to identify, for example, suspicious activity of the device 420. The identity network 105 may have access to information about transactions of device 420 across many identity providers while each individual identity provider (405, 410, and 415) only has access to interactions with that identity provider. The identity network 105 has a more universal view that can be used as a benefit to both the identity providers and the user of the device 420. System 400 includes identity provider A 405, identity provider B 410, identity provider C 415, device 420, identity network 105, and database 425. While only three identity providers are depicted in FIG. 4, any number of identity providers may be included in system 400. Further, while a single device 420 is depicted, system 400 may include any number of devices. Additionally, while identity providers are listed, relying parties may also be included in addition to identity providers.

Identity providers A 405, B 410, and C 415 may each be a company subscribed to the identity network such as a relying party (e.g., relying party 110) or an identity provider (e.g., identity provider 120). For each identity provider 405, 410, and 415, the device 420 may have a device ID. For example, identity provider A 405 has assigned device 420 a locally unique identifier Party A Device ID 432. A different device will have a different device ID with identity provider A 405 than party A device ID 432. Similarly, identity provider B 410 may have assigned device 420 party B device ID 434, and identity provider C 415 may have assigned device 420 party C device ID 436. In this way, any activity performed between device 420 and identity provider A 405 will include party A device ID 432, any activity performed between device 420 and identity provider B 410 will include party B device ID 434, and any activity performed between device 420 and identity provider C 415 will include party C device ID 436.

Identity network 105 also has a unique device ID assigned to device 420. Network device ID 430 is the device ID assigned to device 420 by identity network 105. Any activity performed between identity network 105 and device 420 will include network device ID 430. Further, identity network 105 stores information in database 425 that links party A device ID 432, party B device ID 434, and party C device ID 436 with network device ID 430 so that identity network 105 may identify all known activity of device 420 to that single device 420.

In this way, when identity provider A 405 communicates with identity network 105 about an interaction with device 420, the information can include party A device ID 432. Identity network 105 can access database 425 to identify network device ID 430 based on the received party A device ID 432.

Identity network 105 may develop models of suspicious and normal activity for various users based on demographic and/or other data. Because identity network 105 can review all activity of device 420 with identity providers, the suspicious and normal activity models can be applied to the activity of device 420 to determine whether the device 420 activity is suspicious. If suspicious, identity network 105 can send an alert to the identity provider that may be interacting with device 420 currently or previously. Perhaps, for example, device 420 is a user's smartphone. If the user's smartphone is stolen and the thief accesses the user's accounts to make excessive purchases or transfer money out of the user's bank accounts, identity network 105 may identify the suspicious activity and notify identity providers that may be interacting with device 420. This not only protects the identity providers but the user as well from this type of criminal activity.

Figure 5:
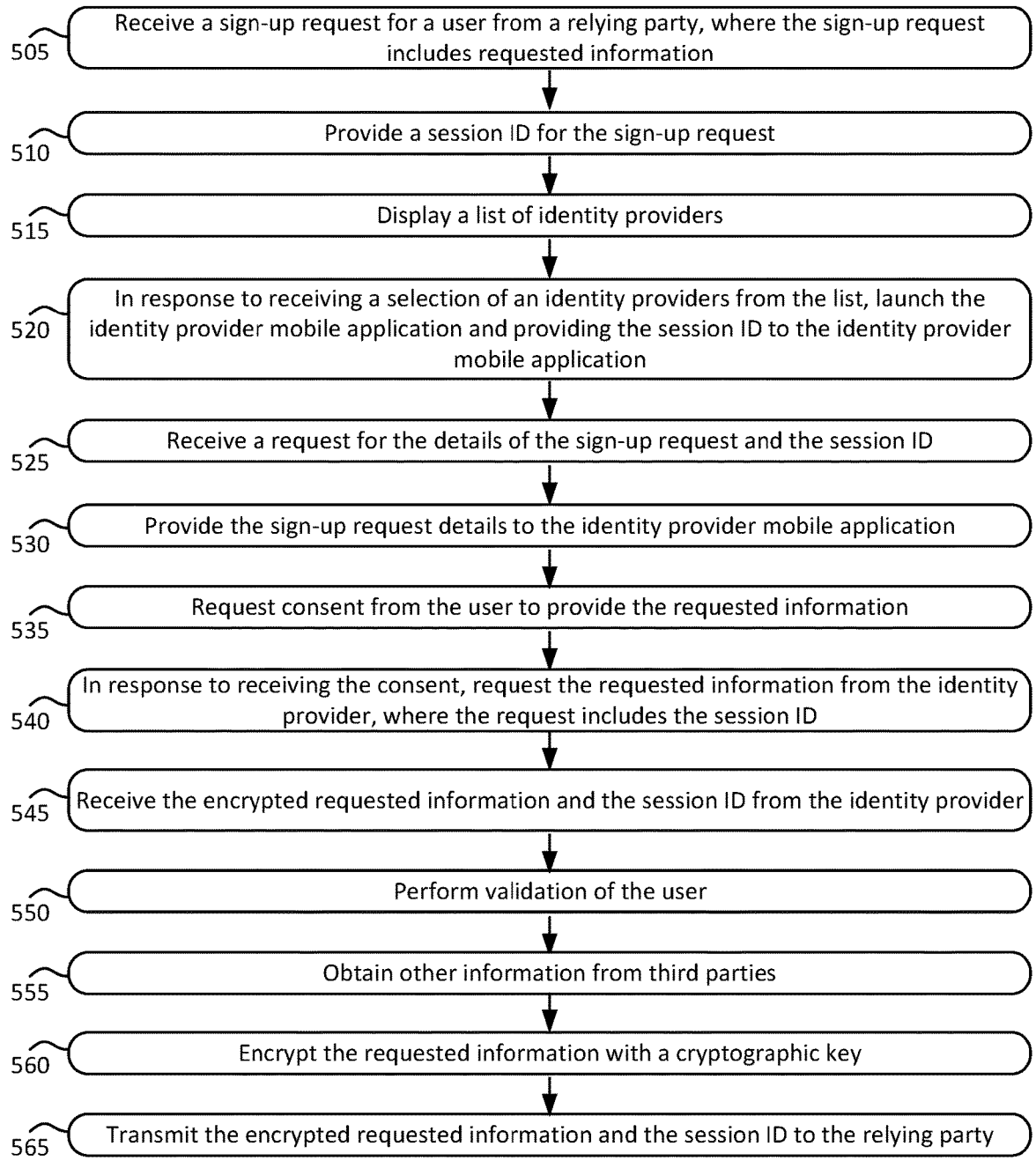
FIG. 5 illustrates an example method for providing an authenticated, universal digital identity for a user, according to an embodiment.

FIG. 5 illustrates a method 500 for using an authenticated digital identity in account creation. Method 500 may be performed by, for example, the identity network 105. Some portions of the method 500 are performed by the software development kits ("SDKs") provided by the identity network 105 to the identity providers 120 and the relying parties 110. Method 500 begins with step 505 when the identity network receives a sign-up for a user from a relying party, where the sign-up request includes requested information. For example, the relying party may have specific information requested to fill out an application by the user. The user may select to use the identity network digital identity for the user to fill out the application. In doing so, the sign-up request from the relying party may include a request for some or all of the user's information needed by the relying party to fill out the application. This information may include any information about the user including, for example, the user's first and last name, address, telephone number, email address, gross income, account balances, driver's license number, driving record, social security number, and so forth.

At step 510, the identity network may provide a session ID to the relying party for the sign-up request. The session ID may be used to track the session and sign-up request throughout the entire process until the relying party receives the requested information or the sign-up request fails or ends for a different reason including, for example, lack of user consent.

At step 515, the SDK in the relying party application provides a list of identity providers to the user via the user interface for the user to select. The list of identity providers may include all enrolled identity providers including, for example, enrolled banks and other financial institutions. The user can select an identity provider with which the user has a relationship. For example, the user may select a bank or other financial institution that the user has an account with.

At step 520, the SDK in the relying party application launches, in response to receiving the selection of an identity provider, the identity provider's mobile application. Each identity provider will include a deep link and/or a web redirect link such that when the user is using a mobile application of the relying party, a deep link is used to launch the identity provider mobile application. If the user is using a web application of the relying party, the web redirect link may launch a new tab or browser and open the identity provider's web application. When the mobile application or web application is launched, the SDK further provides the identity provider application with the session ID. This can be done during the launch or after the launch is initiated. The user will then log into the identity provider application as normal with the user's username and password, biometric information, or other login credentials.

At step 525, the identity network receives a request for the details of the sign-up request and the session ID from the identity provider. In some embodiments, this request for details may include a validation of authentication of the user's digital identity. For example, the user may have successfully authenticated by signing into the identity provider application. The session ID may be used to identify the sign-up request for which the identity provider is requesting details. The request for details may be a request for the sign-up request, a request for the user information being requested by the relying party, or some other request for information about the sign-up request.

At step 530, the identity network provides the sign-up request to the identity provider application. For example, the identity network may provide information about what user information the relying party is requesting.

At step 535, the identity network SDK in the identity provider application can request consent from the user to provide the requested information to the relying party. While the consent request will look like it is being asked by the identity provider, in reality the identity network is requesting and receiving the requisite consent for the transaction as the broker for the information exchange.

At step 540, the identity network, in response to receiving the user's consent, requests the requested information from the identity provider. The request will include the session ID, which is used to track the transaction from beginning to end.

At step 545, the identity network receives at least a portion of the requested information and the session ID from the identity provider. The identity provider may encrypt the user information with a cryptographic key shared with the identity network. The encrypted information may include an explicit confirmation of the identity provider authentication/validation of the user's digital identity, and in some cases providing the encrypted information rather than providing a denial may serve as the confirmation of authentication of the user's digital identity. In some cases, the identity provider may not have all of the requested information about the user. For example, the identity provider may not have the user's driver license number, which may be one piece of user information the relying party is requesting. In some cases, the identity provider will have all of the requested information and provide all of it.

At step 550, the identity network may perform user validation. For example the identity network may utilize the known information about the user to provide a confidence score on the digital identity of the user. For example, if the request of the relying party is to open a new line of credit, this may be uncharacteristic of the user based on known information models for the user's behavior, and may lower the confidence of the identity network that the user is truly the person requesting the new line of credit or whether someone else is trying to use the user's identity to open the new line of credit. In other words, the identity network may provide a confidence score on whether the request may be identity theft. As discussed in FIG. 4, the known activity of the user's device with enrolled relying parties and enrolled identity providers may allow the identity network to generate models of user behavior to identify suspicious activity.

At step 555, in addition to validation, the identity network may also obtain requested user information from external providers if the identity provider did not have or provide all of the requested user information. For example, the social security administration, departments of motor vehicles for each state, and other external providers may be accessed by the identity network for obtaining further information requested about the user.

At step 560, once the information is obtained from the identity provider and, if necessary and possible, the external providers, the identity network encrypts the user information with a cryptographic key. Standard encryption techniques may be used for encryption, and the identity network may use strong encryption to ensure security of the user's information.

At step 565, the identity network transmits the session ID and the encrypted requested information from the sign-up request to the relying party. The relying party may then decrypt the encrypted requested information using the cryptographic key and utilize the information in the user's application with the relying party. In some embodiments, the identity network may decrypt the encrypted requested information and transmit the decrypted requested information to the relying party with the session ID.

FIG. 6 illustrates a block diagram of an example computer system 600 usable for performing image analysis, normalization, and display. The computing device 600 can be or include, for example, a laptop computer, desktop computer, tablet, e-reader, smart phone or mobile device, smart watch, personal data assistant (PDA), or other electronic device.

The computing device 600 can include a processor 640 interfaced with other hardware via a bus 605. A memory 610, which can include any suitable tangible (and non-transitory) computer readable medium, such as RAM, ROM, EEPROM, or the like, can embody program components (e.g., instructions 615) that configure operation of the computing device 600. In some examples, the computing device 600 can include input/output ("I/O") interface components 625 (e.g., for interfacing with a display 645, keyboard, or mouse) and additional storage 630.

The computing device 600 can include network components 620. Network components 620 can represent one or more of any components that facilitate a network connection. In some examples, the network components 620 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 620 can be wired and can include interfaces such as Ethernet, USB, or IEEE 1394.

Although FIG. 6 depicts a single computing device 600 with a single processor 640, the system can include any number of computing devices 600 and any number of processors 640. For example, multiple computing devices 600 or multiple processors 640 can be distributed over a wired or wireless network (e.g., a Wide Area Network, Local Area Network, or the Internet). The multiple computing devices 600 or multiple processors 640 can perform any of the steps of the present disclosure individually or in coordination with one another.

Each of the instructions, calculations, or operations described herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. The instructions or operations may be stored in the non-transitory memory or memory device and executed by the processor, which causes the processor to perform the instructions or operations described.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. In certain cases, method steps or operations may be performed or executed in differing order, or operations may be added, deleted, or modified. It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

It is to be understood that the figures and descriptions of embodiments of the invention have been simplified to illustrate elements that are relevant for a clear understanding of the invention. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted, or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

All patents, patent publications, patent applications, journal articles, books, technical references, and the like discussed in the instant disclosure are incorporated herein by reference in their entirety for all purposes.

What is claimed is:

1. A method for using an authenticated digital identity in account creation, the method comprising:
   receiving, at an identity network, a sign-up request for a user from a relying party, wherein the sign-up request includes requested information;
   in response to receiving the sign-up request, providing, by the identity network to the relying party, a session identifier for the sign-up request;
   upon providing the session identifier, displaying, within a relying party mobile application using an identity network software development kit, a list of identity providers;
   in response to receiving a selection of a first identity provider from the list of identity providers, launching, by the identity network using the identity network software development kit, a first identity provider mobile application wherein launching the first identity provider mobile application includes providing the session identifier to the first identity provider mobile application;
   receiving, by the identity network from the first identity provider mobile application, a validation of authentication of the user;
   in response to receiving the validation, requesting, by the identity network from the first identity provider, the requested information, wherein the session identifier is provided with the request for the requested information;
   receiving, by the identity network from the first identity provider, at least a portion of the requested information and the session identifier;
   encrypting, by the identity network, the at least the portion of the requested information with a cryptographic key; and
   transmitting, by the identity network, the encrypted at least the portion of the requested information and the session identifier to the relying party.

2. The method of claim 1, further comprising:
   receiving, by the identity network from the first identity provider mobile application, a detail request for the sign-up request, wherein the detail request includes the session identifier;
   in response to receiving the detail request, providing, by the identity network, at least a portion of the sign-up request to the first identity provider mobile application; and
   requesting, by the identity network via the first identity provider mobile application using a second software development kit, consent from the user to provide the requested information included in the at least the portion of the sign-up request.

3. The method of claim 1, further comprising:
   validating, by the identity network, the user; and
   transmitting, by the identity network to the relying party, the validation with the encrypted at least the portion of the requested information and the session identifier.

4. The method of claim 3, wherein validating the user comprises calculating a confidence score of the user.

5. The method of claim 1, further comprising:
   obtaining, by the identity network from a third party, other information regarding the user.

6. The method of claim 5, further comprising:
   calculating a confidence score of the user based at least in part on the other information; and transmitting, by the identity network to the relying party, the confidence score with the encrypted at least the portion of the requested information and the session identifier.

7. The method of claim 5, further comprising:
transmitting, by the identity network to the relying party, the other information with the encrypted at least the portion of the requested information and the session identifier.

8. The method of claim 1, further comprising:
transmitting, by the identity network to the relying party, the cryptographic key and the session identifier.

9. A system for using an authenticated digital identity in account creation, the system comprising:
one or more processors; and
a memory having stored thereon instructions that, upon execution by the one or more processors, cause the one or more processors to:
receive a sign-up request for a user from a relying party, wherein the sign-up request includes requested information;
in response to receiving the sign-up request, provide a session identifier for the sign-up request to the relying party;
upon providing the session identifier, display, within a relying party mobile application using an identity network software development kit, a list of identity providers;
in response to receiving a selection of a first identity provider from the list of identity providers, launch, using the identity network software development kit, a first identity provider mobile application wherein launching the first identity provider mobile application includes providing the session identifier to the first identity provider mobile application;
receive a validation of authentication of the user from the first identity provider mobile application;
in response to receiving the validation, request the requested information from the first identity provider, wherein the session identifier is provided with the request for the requested information;
receive at least a portion of the requested information and the session identifier from the first identity provider;
encrypt the at least the portion of the requested information with a cryptographic key; and
transmit the encrypted at least the portion of the requested information and the session identifier to the relying party.

10. The system of claim 9, wherein the instructions comprise further instructions that, upon execution by the one or more processors, cause the one or more processors to:
receive a detail request for the sign-up request from the first identity provider mobile application, wherein the detail request includes the session identifier;
in response to receiving the detail request, provide at least a portion of the sign-up request to the first identity provider mobile application; and
request, via the first identity provider mobile application using a second software development kit, consent from the user to provide the requested information included in the at least the portion of the sign-up request.

11. The system of claim 9, wherein the instructions comprise further instructions that, upon execution by the one or more processors, cause the one or more processors to:
validate the user; and transmit the validation with the encrypted at least the portion of the requested information and the session identifier to the relying party.

12. The system of claim 11, wherein the instructions to validate the user comprises instructions to calculate a confidence score of the user.

13. The system of claim 9, wherein the instructions comprise further instructions that, upon execution by the one or more processors, cause the one or more processors to:
obtain other information regarding the user from a third party.

14. The system of claim 13, wherein the instructions comprise further instructions that, upon execution by the one or more processors, cause the one or more processors to:
calculate a confidence score of the user based at least in part on the other information; and
transmit the confidence score with the encrypted at least the portion of the requested information and the session identifier to the relying party.

15. The system of claim 13, wherein the instructions comprise further instructions that, upon execution by the one or more processors, cause the one or more processors to:
transmit the other information with the encrypted at least the portion of the requested information and the session identifier to the relying party.

16. The system of claim 9, wherein the instructions comprise further instructions that, upon execution by the one or more processors, cause the one or more processors to:
transmit the cryptographic key and the session identifier to the relying party.

17. A non-transitory, computer-readable memory device having stored thereon instructions that, upon execution by one or more processors, cause the one or more processors to:
receive a sign-up request for a user from a relying party, wherein the sign-up request includes requested information;
in response to receiving the sign-up request, provide a session identifier for the sign-up request to the relying party;
upon providing the session identifier, display, within a relying party mobile application using an identity network software development kit, a list of identity providers;
in response to receiving a selection of a first identity provider from the list of identity providers, launch, using the identity network software development kit, a first identity provider mobile application wherein launching the first identity provider mobile application includes providing the session identifier to the first identity provider mobile application;
receive a validation of authentication of the user from the first identity provider mobile application;
in response to receiving the validation, request the requested information from the first identity provider, wherein the session identifier is provided with the request for the requested information;
receive at least a portion of the requested information and the session identifier from the first identity provider;
encrypt the at least the portion of the requested information with a cryptographic key; and
transmit the encrypted at least the portion of the requested information and the session identifier to the relying party.

18. The memory device of claim 17, wherein the instructions comprise further instructions that, upon execution by the one or more processors, cause the one or more processors to:

receive a detail request for the sign-up request from the first identity provider mobile application, wherein the detail request includes the session identifier;

in response to receiving the detail request, provide at least a portion of the sign-up request to the first identity provider mobile application; and request, via the first identity provider mobile application using a second software development kit, consent from the user to provide the requested information included in the at least the portion of the sign-up request.

19. The memory device of claim 17, wherein the instructions comprise further instructions that, upon execution by the one or more processors, cause the one or more processors to:

validate the user; and transmit the validation with the encrypted at least the portion of the requested information and the session identifier to the relying party.

20. The memory device of claim 19, wherein the instructions to validate the user comprises instructions to calculate a confidence score of the user.

\* \* \* \* \*